United States Patent
Aoki et al.

(10) Patent No.: US 6,758,741 B2
(45) Date of Patent: Jul. 6, 2004

(54) VEHICLE INTERIOR STRUCTURE WHICH CAN UNIFORMLY VENTILATE INTERIOR OF VEHICLE

(75) Inventors: Shinji Aoki, Chiryu (JP); Kazushi Shikata, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/679,718

(22) Filed: Oct. 6, 2003

(65) Prior Publication Data

US 2004/0067727 A1 Apr. 8, 2004

(30) Foreign Application Priority Data

Oct. 7, 2002 (JP) ...................................... 2002-293744

(51) Int. Cl.$^7$ .............................................. H60H 1/26
(52) U.S. Cl. .................... 454/137; 62/244; 297/180.14; 454/75; 454/120; 454/143; 454/158
(58) Field of Search ................................ 454/120, 136, 454/137, 143, 156, 158, 75; 62/244; 297/180.1, 180.13, 180.14

(56) References Cited

U.S. PATENT DOCUMENTS

| | | | |
|---|---|---|---|
| 2,522,612 A | * | 9/1950 | Harben ........................ 428/81 |
| 3,550,523 A | * | 12/1970 | Segal ......................... 454/120 |
| 4,342,203 A | * | 8/1982 | Moore .......................... 62/244 |
| 2003/0197404 A1 | * | 10/2003 | Ekern et al. ........... 297/180.11 |

FOREIGN PATENT DOCUMENTS

| | | | |
|---|---|---|---|
| JP | 5-244731 | | 9/1993 |
| JP | 02000219090 | * | 8/2000 |

OTHER PUBLICATIONS

Web page at www.cisnet.orjp/home/hitoshi by Deltatooliing Co. Ltd. since Apr.6, 2001.

* cited by examiner

Primary Examiner—Harold Joyce
(74) Attorney, Agent, or Firm—Harness, Dickey & Pierce, PLC

(57) ABSTRACT

A vehicle interior structure includes an air vent wall. The air vent wall has a nonpermeable layer, a nonpermeable surface layer and a permeable layer. The permeable layer has a three-dimensional net construction and is disposed between the nonpermeable layer and the nonpermeable surface layer. The permeable layer has two welded nonpermeable portions, which are extended linearly. An air passage is formed between the welded nonpermeable portions. The vehicle interior structure is applied to a vehicle temperature control system including an air conditioning unit and an air blower unit. The interior of the vehicle is ventilated through the air passage of the air vent wall.

14 Claims, 5 Drawing Sheets

VEHICLE INTERIOR STRUCTURE WHICH CAN UNIFORMLY VENTILATE INTERIOR OF VEHICLE

CROSS REFERENCE TO RELATED APPLICATION

This application is based on Japanese Patent Application No. 2002-293744 filed on Oct. 7, 2002, the disclosure of which is incorporated herein by reference.

FIELD OF THE INVENTION

The present invention relates to a vehicle interior structure having air vent walls for introducing conditioned air or ventilating air there through into the interior of a vehicle, and, more particularly to a vehicle temperature control system employing the vehicle interior structure.

BACKGROUND OF THE INVENTION

Heretofore, the interior of a vehicle is ventilated through ventilating openings provided in predetermined positions thereof. For example, in a system described in JP-A-H5-244731, air is drawn from the outside through an air inlet of a ventilator, and interior air is discharged through a ventilating opening positioned in a rear tray. The air inlet and the ventilating opening are hard to be mounted on the other parts of the vehicle. Therefore, the ventilating air is likely to be drawn into only predetermined compartments inside the vehicle, that is, the interior of the vehicle is hard to be uniformly ventilated.

SUMMARY OF THE INVENTION

In view of the foregoing problem, the purpose of the present invention is to provide a vehicle interior structure that can achieve comfortable air conditioning and effective ventilation inside a vehicle.

According to the present invention, a vehicle interior structure has at least one air vent wall. The interior structure includes a nonpermeable layer, a nonpermeable surface layer and a permeable layer. The permeable layer has a three-dimensional net construction and is disposed between the nonpermeable layer and the nonpermeable surface layer. The permeable layer has at least two welded nonpermeable portions, which are extended linearly. An air passage is formed between the welded nonpermeable portions.

Since the air vent wall has the air passage, the air passages can be formed in various interior components having the air vent walls. Therefore, the air can be blown from the various interior components of the vehicle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

The embodiment of the present invention will be described in detail with reference to the accompanying drawings.

In this embodiment, a vehicle temperature control system is applied to a vehicle provided with a vehicle interior structure according to the present invention.

Figure 1:
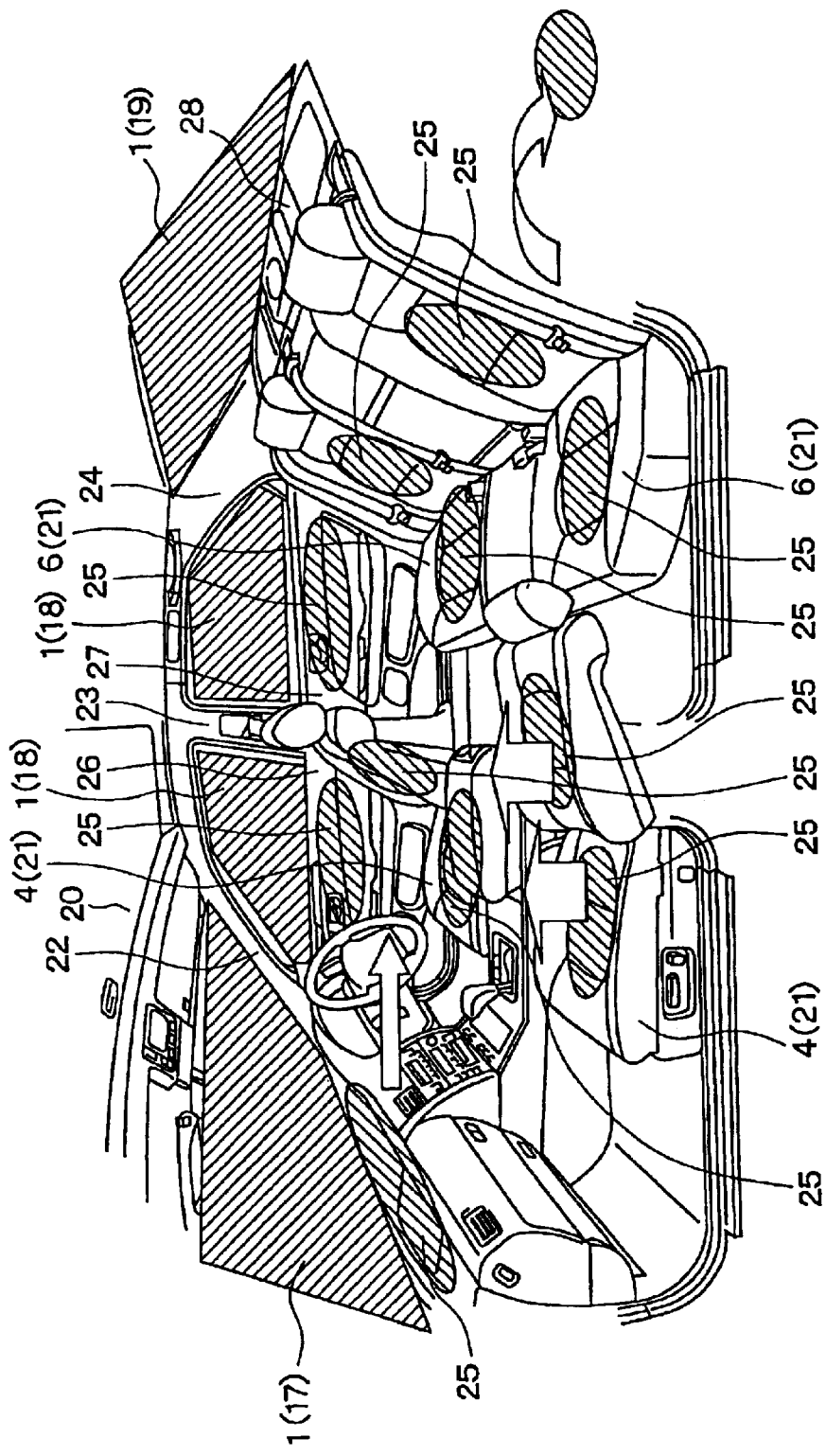
FIG. 1 is a schematic diagram of a vehicle interior structure according to an embodiment of the present invention.

As shown in FIG. 1, electrically operational sun shades 1 are provided for a windshield 17, side windows 18 and a rear window 19. The sun shades 1 are cloth curtains and reduce the amount of the sunlight permeating the interior of the vehicle. Moreover, the sun shades 1 can be closed or shut by an electric motor (not shown) controlled by an electrical control device (not shown).

Figure 2:
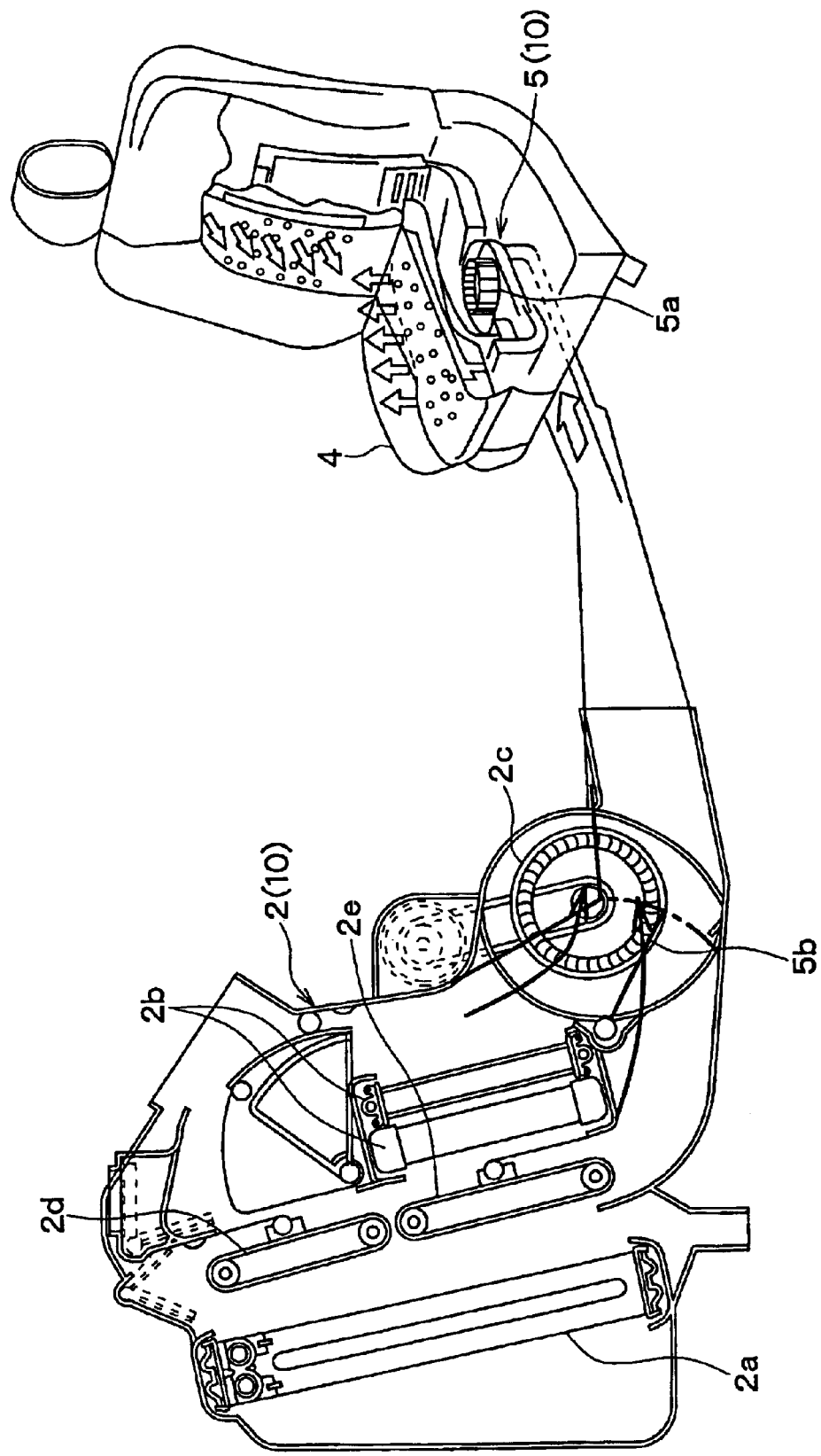
FIG. 2 is a schematic diagram of a part of a vehicle temperature control system according the embodiment.
Figure 3:
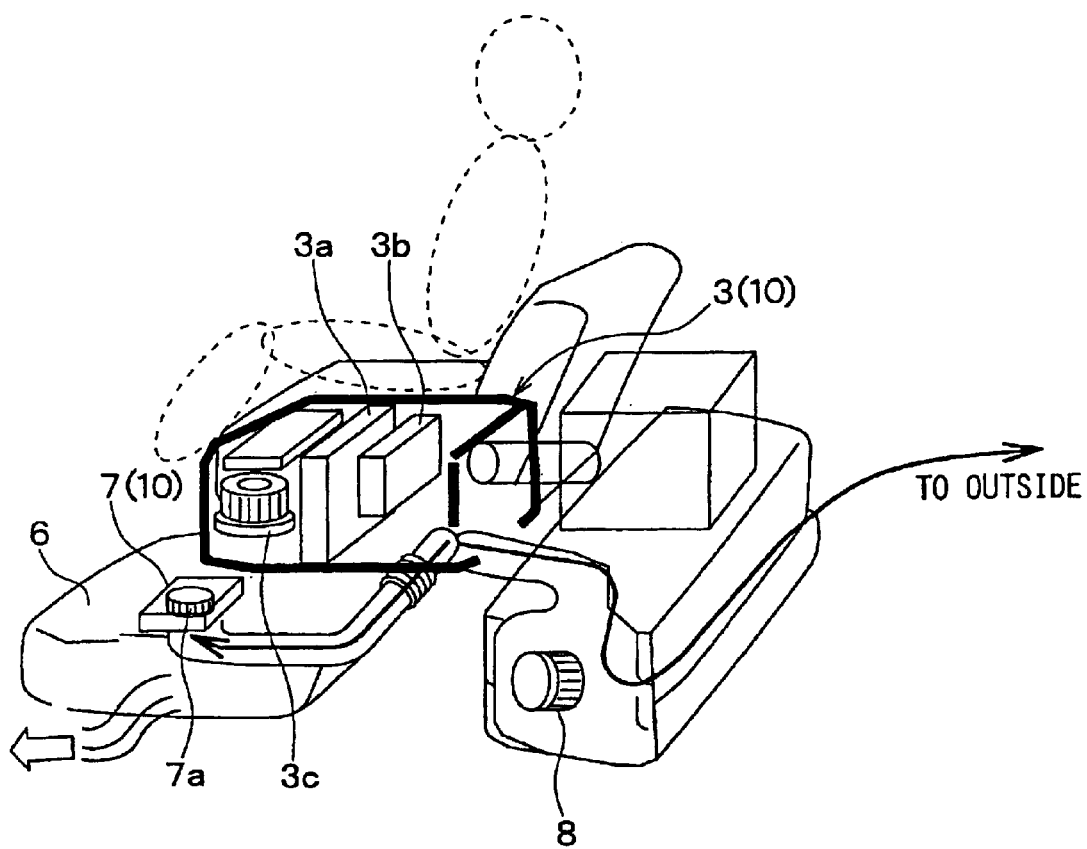
FIG. 3 is a schematic diagram of another part of the vehicle temperature control system.

A vehicle air conditioner 10 is provided for the vehicle. As shown in FIGS. 2 and 3, the vehicle air conditioner 10 includes a front conditioner unit 2, a rear conditioner unit 3, a front blower unit 5 and a rear blower unit 7. The front conditioner unit 2 conditions the air around the front passenger compartment of the vehicle. The rear conditioner unit 3 conditions the air around the passenger compartment of the vehicle. The front blower unit 5 sends the air through the surface of a front seat 4. The rear blower unit 7 sends the air through the surface of a rear seat 6.

The conditioner units 2, 3 respectively have low pressure side heat exchangers 2a, 3a, heaters 2b, 3b and blowers 2c, 3c. The low pressure side heat exchanger 2a (3a) is a thermo-compression refrigerator that cools the air blowing toward the passenger compartment. The heater 2b (3b) is disposed downstream from the low pressure side heat exchanger 2a (3a) in the air flowing direction and heats the air blowing toward the passenger compartment.

Moreover, film doors 2d, 2e shown in FIG. 2 control the circulation of the air. Specifically, the door 2d switches an opening degree of a cool air passage, which bypasses the heater 2b, and the door 2e switches an opening degree of a hot air passage, which passes through the low pressure side heat exchanger 2a. In the rear conditioning unit 3, film doors corresponding to the film doors 2d, 2e are omitted to be shown.

A blower 5a of the blower unit 5, which is installed in a lower part of the front seat 4, draws the air conditioned in the front conditioner unit 2 and sends it through the surface of the seat 4. Moreover, a blower 7a of the front blower unit 7, which is installed in a lower part of the rear seat 6, draws the air conditioned in the rear conditioner unit 3 and sends it through the surface of the seat 6.

Further, in the front conditioner unit 2, the mixing ratio between cool air and hot air is controlled by an air mix door 5b, and thereby the temperature of the air blown from the seat 4 is controlled. In the rear conditioner unit 3, an air mix door corresponding to the air mix door 5b is omitted to be shown. In addition, as shown in FIG. 3, a discharge blower 8 is provided and thereby forcibly discharges the inside into a trunk room.

In this embodiment, air vent walls 9 are provided for a plurality of interior components (e.g. a roof 20, passenger seats 21, pillars 22, 23, 24, a rear tray 28 and doors 26, 27, etc.). The air vent wall 9 has a multilayer structure shown in FIG. 4A and has a permeable layer 9a. The permeable layer 9a is made of polyethylene terephthalate and has a three-dimensional net construction. Each air vent wall 9 is communicated with the front conditioning unit 2 or the rear conditioning unit 3, and thereby the air from the conditioning units 2, 3 can be blown out through the air vent walls 9 of the roof 20, the pillars 22, 23, 24, the doors 26, 27 and so on. Specifically, the surfaces from which the air blows are located at blower surfaces 25, which are elliptically hatched in FIG. 1. Moreover, the roof 20 and the rear tray 28 have the blower surfaces 25 (not shown).

The air vent wall 9 essentially consists of a metallic exterior wall (nonpermeable layer) 9b, a heat-insulating layer (nonpermeable layer) 9c, the permeable layer 9a and a designed interior wall (nonpermeable surface layer) 9d. The heat-insulating layer 9c is made of resin (e.g. polyester, polyurethane). The designed interior wall 9d is made of a fabric material and electrified, and thereby its backside can function as a filter for filtering dusts.

In regard to an air passage inside the air vent wall 9, the permeable layer 9a has two welded nonpermeable portions 9a3, 9a4, and the air passage is formed between the two welded nonpermeable portions 9a3, 9a4. In the air vent wall 9 shown in FIG. 4A, a partial permeable layer disposed between the welded nonpermeable portions 9a3, 9a4 is used as the air passage 9a1, and partial permeable layers 9a2, which are not used as air passages, are disposed outside of the welded nonpermeable portions 9a3, 9a4.

The air vent walls 9 having the air passages form the walls of the interior components of the vehicle. Moreover, the air passages are communicated with the front conditioner unit 2. Specifically, the air from the air conditioner 2 passes through the air passages 9a1 (air vent walls 9) of the interior components (e.g. the roof 20, the seats 21, the pillars 22, 23, 24, the rear tray 28 and doors 26, 27). Moreover, the air reaches the blower surfaces 25 and blown therefrom.

Figure 4A:
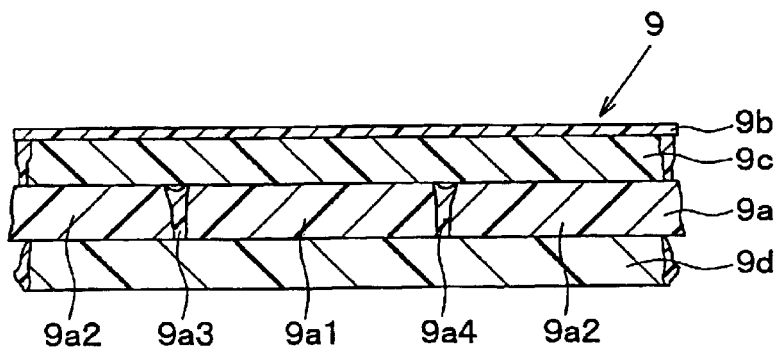
FIGS. 4A to 4E are schematic diagrams of an air vent wall of the vehicle interior structure illustrating the structure and the producing method thereof.
Figure 4B:
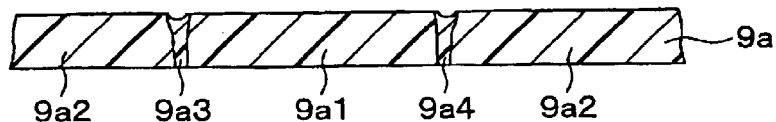

When the air vent wall 9 is manufactured, at first as shown in FIG. 4B, the welded nonpermeable portions 9a3, 9a4 are formed by way of irradiating the laser or the ultrasonic welding. In this way, the welded nonpermeable portions 9a3, 9a4 are formed to be nonporous, and the air passage 9a1 is formed therebetween. Moreover, the permeable layer 9 is installed on the heat-insulating layer 9c on the metallic exterior wall 9b, for example, of the roof 20.

Next, the designed interior wall 9d, made of a fabric material, is electrically charged on the side of the metallic exterior wall 9b and attached to the permeable layer 9a. Otherwise, the heat-insulating layer 9c, the permeable layer 9a and the designed interior wall 9d may be simultaneously attached to the metallic exterior wall 9b after integrated.

Figure 4C:
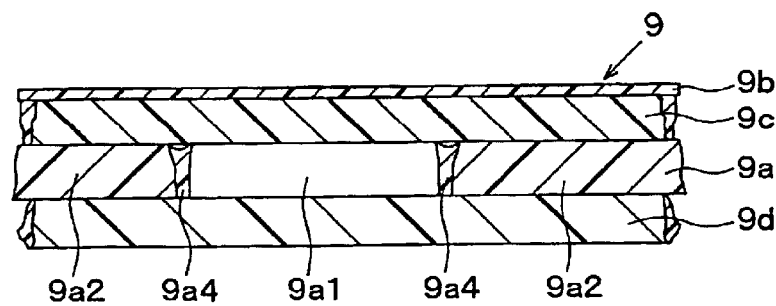

FIG. 4C shows another example of an air vent wall 9 having an air passage 9a1. In the air vent wall 9 shown in FIG. 4A, the air passage 9a1 is filled with the permeable layer 9a. However, in the air vent wall shown in FIG. 4C, the air duct 9a1 is a vacant space.

Figure 4D:
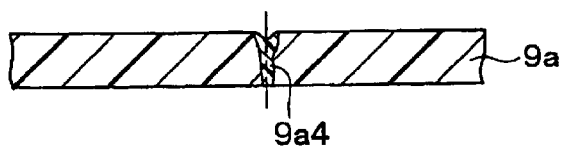
Figure 4E:
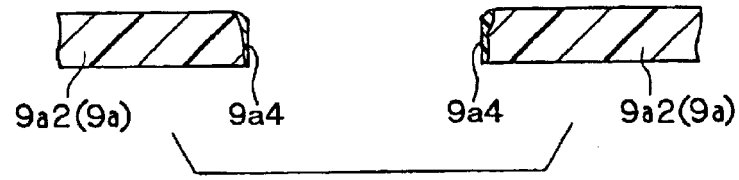

In order to manufacture the air vent wall 9 shown in FIG. 4C, at first, as shown in FIG. 4D, a welded nonpermeable portion 9a4 is formed in the permeable layer 9a by way of ultrasonic welding. Next, as shown in FIG. 4E, the three dimensional net 9a is separated at the welded nonpermeable portion 9a4. Moreover, the separated pieces of permeable layer 9a are installed on the heat-insulating layer 9c on metallic body 9b, for example, of the roof 20. Finally, the designed interior wall 9d, made of a fabric material, is electrically charged on the side of the metallic body 9b and installed on the permeable layer 9a. In this connection, by virtue of the welded nonpermeable portions 9a4, the air does not enter the partial permeable layers 9a2 from the air passage 9a1. Otherwise, the heat-insulating layer 9c, the permeable layer 9a and the designed interior wall 9d may be simultaneously installed on the metallic body 9b after integrated.

The designed interior walls 9d shown in FIGS. 4A and 4C are generally nonpermeable. Moreover, the heat-insulating layer 9c is nonpermeable. In this case, the air passage 9a1 functions as an air duct. However, when the air vent wall 9 is used for an interior component though which the air is required to be blown out, the designed interior wall 9d of this air vent wall 9 may be formed to be permeable.

As the other structure of an air vent wall 9, the heat-insulating layer 9c may be omitted. Moreover, a thin nonpermeable sheet may be disposed between the permeable layer 9 and the designed interior wall 9d so as to prevent the air from leaking.

Hereinafter, the actions of this embodiment will be described.

For example, in a case where the vehicle is parked, when the temperature outside the vehicle becomes higher than 20 degrees, or when the amount of the sunlight irradiating the interior of the vehicle becomes more than 150 W/m$^2$, the windshields are covered by sunshades 1, and thereby the sunlight is shut off. Simultaneously, the front conditioner unit 2 introduces the outside air into the vehicle, and moreover the blowers 5a, 7a of the air blower units 5, 7 are driven so as to circulate the air inside the vehicle.

In this connection, the rear conditioner unit 3 can only circulate the air inside the vehicle and cannot introduce the outside air into the vehicle. Therefore, the outside air is not introduced enough into the rear passenger compartment. However, when employing a vehicle air conditioner having a rear conditioner unit that can introduce the outside air into the vehicle, it is desired that the outside air be introduced into the vehicle through the use of the rear conditioner unit by driving a blower of its rear blower unit.

Moreover, in addition to the blowers 5a, 7a of the blower units 5, 7, the blowers 2c, 3c of the conditioner units 2, 3 are driven, and thereby the circulating performance is enhanced. Incidentally, in the parked vehicle, the blowing performance of the blower 2c is set to be about 160 m$^3$/h, and the blowing performance of the blower 3c is set to be about 80 m$^3$/h. Moreover, the blowing performance of the blowers 5a, 5c is set to be about 40 m$^3$/h.

Further, in this embodiment, while the starter switch (e.g. ignition switch) of the vehicle is OFF, the vehicle is determined to be parked. Otherwise, while the starter switch is ON, the vehicle is determined not to be parked. For detecting the amount of the sunlight irradiating the interior of the vehicle, a sunlight sensor (not shown) of the air conditioner is used. For detecting the temperature of the outside, an outside temperature sensor (not shown) of the air conditioner unit is used. In this way, the amount of the sunlight and the outside temperature are detected.

Hereinafter, the effects of this embodiment will be described. When the vehicle is parked, the amount of the sunlight is reduced by the sunshades 1. Therefore, the interior components of the vehicle, which generally have the larger heat capacities, can be prevented from being heated. Accordingly, the radiant heat from the interior components is restricted, and thereby the air inside the vehicle is prevented from being heated.

Figure 5:
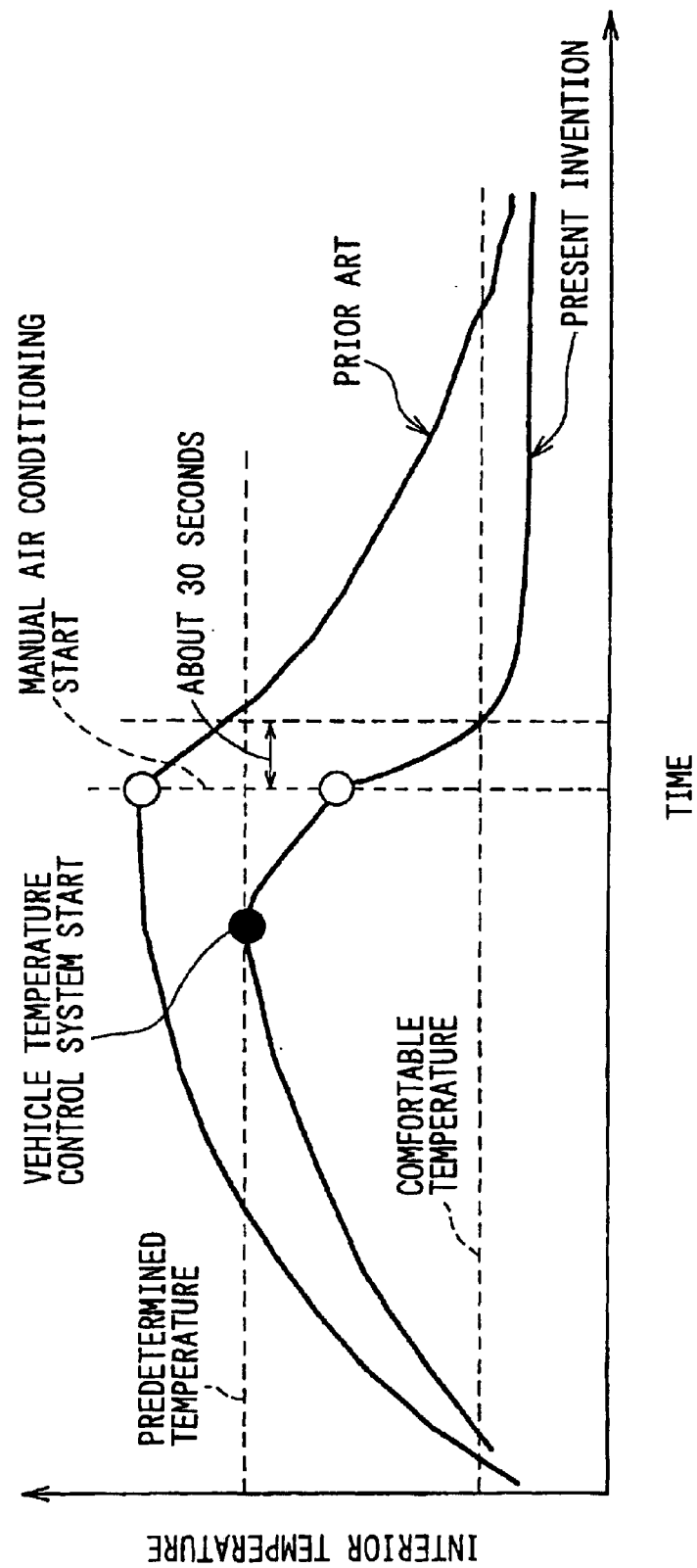
FIG. 5 is a graph showing the relationship between interior temperature of a vehicle and elapsed time since the vehicle is parked, the vehicle employing the vehicle interior structure.

Moreover, as shown in FIG. 5, after a passenger get on the vehicle and manually starts activating the air conditioner, the temperature inside the vehicle can be lowered into a comfortable value rapidly. Consequently, the electric power consumption of the vehicle air conditioner can be totally reduced.

Furthermore, the air vent wall 9, including the permeable layer 9a having the three-dimensional net structure, is employed for the interior components of the vehicle. Therefore, the higher heat-insulation performance is achieved by virtue of air stored in the permeable layer 9a. In addition, the air can be effectively blown through the air vent walls into the passenger compartment wholly, and thereby the comfortable air conditioning can be achieved.

Other Embodiments

In the above embodiment, the sunshades 1 shut off the sunlight irradiating the vehicle interior, and simultaneously the air starts to be ventilated. Otherwise, when the temperature inside the vehicle becomes more than a predetermined value, or when the amount of the sunlight becomes more than a predetermined value, or when the temperature outside the vehicle becomes more than a predetermined value, only the air ventilation may be performed. In this case, it is desired that the above amount of the sunlight be detected as the total amount the sunlight since the vehicle has been parked.

Moreover, when the temperature outside the vehicle becomes a value more than 20 degrees, or when the amount of the sunlight irradiating the vehicle interior becomes more than 150 W/m$^2$, the sunlight is shut by the sunshades 1. Otherwise, the sunlight may be shut on the basis of the position of the sun detected by a global positioning system (GPS) or a calendar device.

Moreover, both the blowers 5*a*, 7*a* of the blower units 5, 7 and the blowers 2*c*, 3*c* of the conditioner units 2, 3 are driven and thereby the air inside the vehicle is ventilated. However, the air may be ventilated by driving only one set of the blowers. In this connection, since the blowers 2*c*, 3*c* are more effectively, the set of the blowers 2*c*, 3*c* are desired to be driven for ventilating the air.

While the vehicle is parked, the air conditioner may be manually started by switching, for example, a door knob or an accessory switch.

Moreover, the sunshades 1 are employed for shutting off the sunlight. Otherwise, the windshields may be made of a dimmer glass, the light-transmittance of which can be controlled by applying a voltage thereto. Understandably, both the sunshades 1 and the dimmer glass may be employed for shutting off the sunlight.

Moreover, only the air passage 9*a*1 between the welded nonpermeable portions 9*a*3, 9*a*4 is used as the air duct. However, all the permeable layer 9 may be used as the air duct.

Moreover, the blower surfaces 25 are defined as the surfaces through which the air is blown. However, the blower surfaces 25 may be used as the surfaces through which the air is discharged or drawn.

It will be obvious to those having skill in the art that many changes may be made in the above-described details of the preferred embodiments of the present invention. The scope of the present invention, therefore, should be determined by the following claims.

What is claimed is:

1. A vehicle interior structure comprising at least one air vent wall including:
    at least one nonpermeable layer;
    a nonpermeable surface layer; and
    a permeable layer having a three-dimensional net construction, wherein:
    the permeable layer is disposed between the nonpermeable layer and the nonpermeable surface layer;
    the permeable layer has at least two welded nonpermeable portions, which are extended linearly; and
    an air passage is formed between the welded nonpermeable portions.

2. The vehicle interior structure according to claim 1, wherein the welded nonpermeable portions are nonporous.

3. The vehicle interior structure according to claim 1, wherein:
    the permeable layer is made of a synthetic resin; and
    the welded nonpermeable portions are formed by way of welding with heat.

4. The vehicle interior structure according to claims 1, wherein:
    the nonpermeable layer forms at least one of an exterior wall of the vehicle and a heat-insulating layer of the vehicle.

5. The vehicle interior structure according to claims 1, wherein the air passage between the welded nonpermeable portions is filled with the permeable layer.

6. The vehicle interior structure according to claim 1, wherein the air passage between the welded nonpermeable portions is a vacant space.

7. The vehicle interior structure according to claim 1, wherein the nonpermeable surface layer is a designed interior wall of the vehicle.

8. The vehicle interior structure according to claim 1, wherein the air vent wall further includes a filtering layer for filtering dusts, the filtering layer being disposed between the nonpermeable surface layer and the permeable layer.

9. The vehicle interior structure according to claim 8, wherein:
    the filtering layer is formed integrally with one surface of the nonpermeable surface layer, the one surface facing the permeable layer; and
    the filtering layer is made of a fabric material and electrified.

10. A vehicle temperature control system comprising:
    at least one of an air conditioning unit and an air blower unit; and
    the vehicle interior structure according to claim 1, wherein an interior of the vehicle is ventilated through the air passage of the air vent wall according to claim 1.

11. The vehicle temperature control system according to claim 10, wherein the vehicle temperature control system starts to ventilate the air inside the vehicle when temperature of the air inside the vehicle becomes a value higher than a predetermined value in a state where the vehicle is parked.

12. The vehicle temperature control system according to claim 10, wherein the vehicle temperature control system starts to ventilate the air inside the vehicle when an amount of sunlight irradiating the vehicle becomes a value larger than a predetermined value in a state where the vehicle is parked.

13. The vehicle interior structure according to claim 1, further comprising an air conditioner, which is communicated with the air passage, wherein:
    the vehicle includes a roof, a door and a pillar;
    the air vent wall is disposed on at least one of the roof, the door and the pillar of the vehicle; and
    through the air passage of the air vent wall, air is blown toward an inside of the vehicle.

14. The vehicle interior structure according to claim 13, wherein a part of the nonpermeable surface layer is permeable and functions as an air outlet.

* * * * *